United States Patent
Miyawaki et al.

(10) Patent No.: US 6,522,360 B1
(45) Date of Patent: *Feb. 18, 2003

(54) IMAGE PICKUP APPARATUS PERFORMING AUTOFOCUS PROCESSING AND IMAGE ENLARGEMENT IN A COMMON SELECTED IMAGE PLANE REGION

(75) Inventors: Mamoru Miyawaki, Kanagawa-ken (JP); Mahito Shinohara, Tokyo (JP); Isamu Ueno, Kanagawa-ken (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,314

(22) Filed: Feb. 26, 1997

Related U.S. Application Data

(63) Continuation of application No. 08/701,001, filed on Aug. 21, 1996, now abandoned, which is a continuation of application No. 08/316,578, filed on Sep. 30, 1994, now abandoned.

(30) Foreign Application Priority Data

Oct. 4, 1993 (JP) .............................. 5-271261
Oct. 4, 1993 (JP) .............................. 5-271262

(51) Int. Cl.[7] ..................... G03B 13/00; H04N 5/222; H04N 5/262
(52) U.S. Cl. .............. 348/347; 348/240.2; 348/333.03; 348/333.12; 348/354; 396/51
(58) Field of Search ................. 348/240, 350, 348/345, 333, 349, 351, 354, 355, 356, 358, 561; 396/96, 121, 123, 51, 373, 374, 379; 382/293, 298

(56) References Cited

U.S. PATENT DOCUMENTS

| | | | | |
|---|---|---|---|---|
| 4,574,314 A | * | 3/1986 | Weinblatt | 348/350 X |
| 4,991,020 A | * | 2/1991 | Zwirn | 348/240 X |
| 5,107,334 A | * | 4/1992 | Matsumoto | 348/561 |
| 5,223,934 A | * | 6/1993 | Hong | 348/240 X |
| 5,335,035 A | * | 8/1994 | Maeda | 396/51 |
| 5,589,908 A | * | 12/1996 | Irie | 396/51 |
| 5,594,500 A | * | 1/1997 | Tanaka | 348/345 |

FOREIGN PATENT DOCUMENTS

| | | | | |
|---|---|---|---|---|
| DE | A-38 41 575 | | 7/1989 | G03B/3/00 |
| EP | A-0 113 392 | | 7/1984 | H04N/5/26 |
| EP | A-0 341 692 | | 11/1989 | H04N/5/232 |
| EP | A-0 480 774 | | 4/1992 | A61B/3/113 |
| FR | A-2 635 881 | | 3/1990 | G03B/13/36 |
| GB | A-2 249 897 | | 5/1992 | H04N/5/445 |
| JP | 4046472 | * | 2/1992 | H04N/5/232 |
| JP | 5161054 | * | 6/1993 | H04N/5/232 |

* cited by examiner

Primary Examiner—Ngoc-Yen Vu
(74) Attorney, Agent, or Firm—Robin, Blecker & Daley

(57) ABSTRACT

An image pickup apparatus is provided with a visual line detecting device for detecting the position of a fixation point of the eye of the operator obtained within the image plane of an electronic viewfinder which displays an image of an object of shooting, and an image processing circuit for processing and enlarging the image with the detected position of the fixation point as the center of the enlarging action.

20 Claims, 14 Drawing Sheets

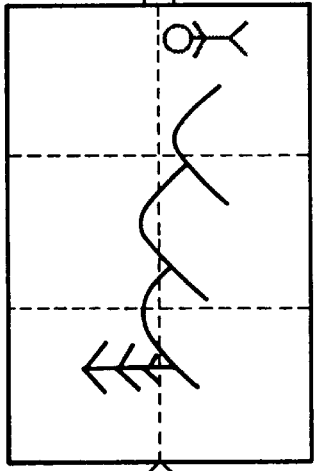
FIG.10(a)
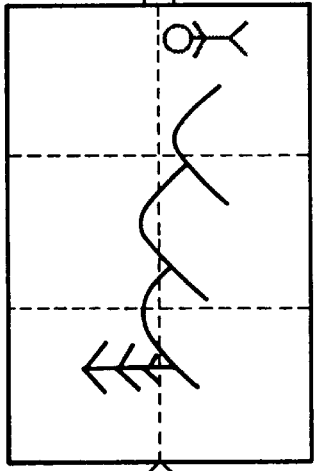
FIG.10(b) PILOT LAMP LIGHTED (AREA 1)
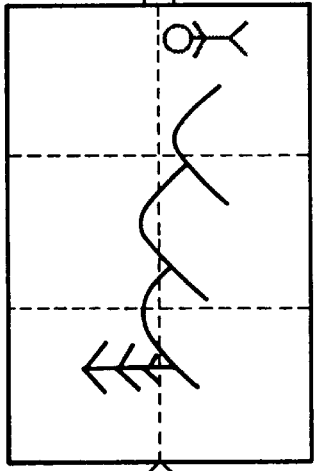
FIG.10(c) PILOT LAMP LIGHTED (AREA 2)
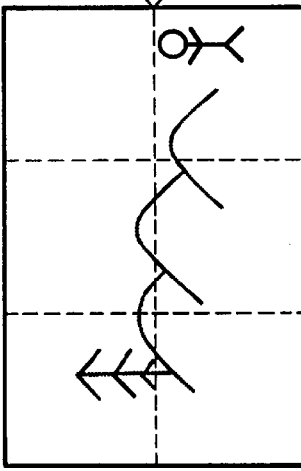
FIG.10(d) PILOT LAMP LIGHTED (AREA 6)
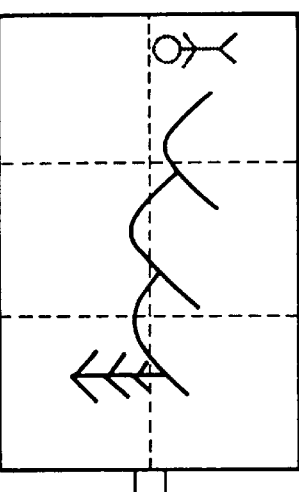
FIG.10(e) SELECTION SWITCH PUSHED (ELECTRONIC ZOOM)
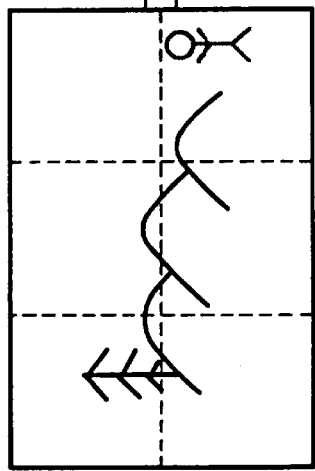
FIG.10(f) AF

IMAGE PICKUP APPARATUS PERFORMING AUTOFOCUS PROCESSING AND IMAGE ENLARGEMENT IN A COMMON SELECTED IMAGE PLANE REGION

This is a continuation of prior application Ser. No. 08/701,001 filed on Aug. 21, 1996 (abandoned), which is a continuation of Ser. No. 08/316,578, filed on Sep. 30, 1994 (abandoned).

BACKGROUND OF THE INVENTION

1. Field of the Invention

This invention relates to an image pickup apparatus such as a camera-integrated type VTR.

2. Description of the Related Art

The recent advancement of video apparatuses such as camera-integrated type VTRs, etc., is conspicuous. In the case of the camera-integrated type VTRs, for example, they are now arranged to have many functions including an automatic focusing (abbreviated to AF) function, an automatic exposure (abbreviated to AE) function and other, functions such as zooming at a high magnification zooming, electronic zooming which enlarges images by electronic image processing, etc., and to have improved operability. Meanwhile, an electronic viewfinder (abbreviated to EVF) is regularly used to display various kinds of messages as well as to permit monitoring picked-up images.

FIG. 1 is a block diagram schematically showing by way of example the structure of a camera-integrated type VTR of the above-stated kind. Referring to FIG. 1, an object of shooting is imaged and focused through a lens 59 on the image pickup plane of an image sensor 51 which is a CCD or the like imager. The image is photo-electrically converted by the image sensor 51 and is outputted as a picked-up image signal. The picked-up image signal is sampled and held by a sample-and-hold (abbreviated to S/H) circuit 52. The sampled and held image signal is supplied to a gamma correction and AGC (automatic gain control) circuit 53. The image signal is gamma-corrected and has its gain automatically controlled by the gamma correction and AGC circuit 53. The signal thus processed is supplied to a TV-AF (television-AF) circuit 54 to be converted into an electrical signal indicating the state of blur of the image. More specifically, at the TV-AF circuit 54, a high frequency component of the picked-up image signal is extracted by converting the electrical signal outputted from the gamma correction and AGC circuit 53 into the differentiated waveform the frequency band of which is limited. The high frequency component thus extracted from the picked-up image signal is used as a focus evaluation value. Hence, the larger the peak value of the signal outputted from the TV-AF circuit 54, the closer a state of the lens 59 to an in-focus point. The lens 59 is driven in the direction in which the peak value of the signal outputted from the TV-AF circuit 54 increases. Following this, the analog signal outputted from the TV-AF circuit 54 is supplied to an A/D (analog-to-digital) converter 55 to be converted into a digital signal. The digital signal is supplied to a microcomputer 56. Then, the digital signal processed by the microcomputer 56 is supplied to a D/A (digital-to-analog) converter 57 to be converted into an analog signal. The analog signal is sent to a motor 58 as a driving signal. The motor 58 then shifts the position of the lens 59 toward the in-focus point by driving it in the direction in which the output of the TV-AF circuit 54 increases. Meanwhile, the electrical signal (picked-up image signal) from the photo-electric converting element 51 (image sensor) is sent through the gamma correction and AGC circuit 53 also to a panel 60 which is provided for an EVF and serves as a monitor. The eye 61 of an operator of the camera-integrated type VTR can see through a lens 62 images displayed on the EVF panel 60.

In the camera-integrated type VTR described above, however, an area which is used for focusing within the pickup image plane on the basis of the signal outputted from the TV-AF circuit 54 is fixed. The fixed focusing area has sometimes prevented the operator from focusing on some other area. For example, the camera is arranged to automatically focus a lens on an area A among others while the operator wishes to focus it on another area B, as shown in FIG. 2. The lens is then focused on the area A which has a distant landscape imaged there and not on a person which is a main object of shooting and is imaged in the area B. As a result, the image of the person is obtained only in a blurred state.

SUMMARY OF THE INVENTION

This invention is directed to the solution of the problem mentioned above. It is a first object of this invention to provide a camera-integrated type VTR which is capable of automatically bringing the camera into focus on a video image area determined within an image plane according to a visual line of an operator of the VTR.

It is a second object of this invention to provide a camera-integrated VTR which is capable of displaying in an enlarged state an image obtained in a video image area determined within an image plane according to a visual line of an operator of the VTR.

To attain these objects, a camera-integrated type VTR which is arranged as a preferred embodiment of this invention includes photo-electric converting means for converting an optical image of an object of shooting into an electrical signal, an electronic viewfinder, a control part for processing the electrical signal outputted from the photo-electric converting means to obtain a video signal and for sending the video signal to the electronic viewfinder, visual line sensing means for sensing the direction of a visual line of an operator of the VTR, and an optical system arranged to guide reflection light from an eye of the operator to the visual line sensing means. The control part includes focusing means arranged to control a focusing area on the image of the object on the basis of a result of a sensing action of the visual line sensing means.

A camera-integrated type VTR arranged as another embodiment of this invention includes, in addition to the parts described above, extracting means for extracting, from a composite signal composed of a video signal obtained from the image of the object and a reflection light signal formed from the reflection light coming from the eye of the operator, the reflection light signal.

A camera-integrated type VTR which is a further preferred embodiment of this invention is arranged to determine a focusing area according to the direction of the visual line of the eye of the operator, and also to determine the focusing area according to the direction of the visual line of the eye of the operator by extracting, from a composite signal composed of a video signal obtained from the image of the object and a reflection light signal obtained from the reflection light coming from the eye of the operator, the reflection light signal.

An image processing apparatus which is arranged as a still further preferred embodiment of this invention includes monitor means arranged to display an image represented by an image signal inputted, visual line detecting means for detecting the position of a visual line of an operator of the apparatus within a display image plane of the monitor means, and image enlarging means arranged to enlarge an image in a predetermined area corresponding to the position of the visual line detected by the visual line detecting means within the display image plane and to cause the monitor means to display the enlarged image.

The above-stated objects and other objects and features of this invention will become apparent from the following detailed description of embodiments thereof taken in conjunction with the accompanying drawings.

BRIEF DESCRIPTION OF THE DRAWINGS

FIGS. 10(a) to 10(f) show image information on a LCD and image information to be recorded by a VTR.

DETAILED DESCRIPTION OF THE PREFERRED EMBODIMENTS

Figure 1:
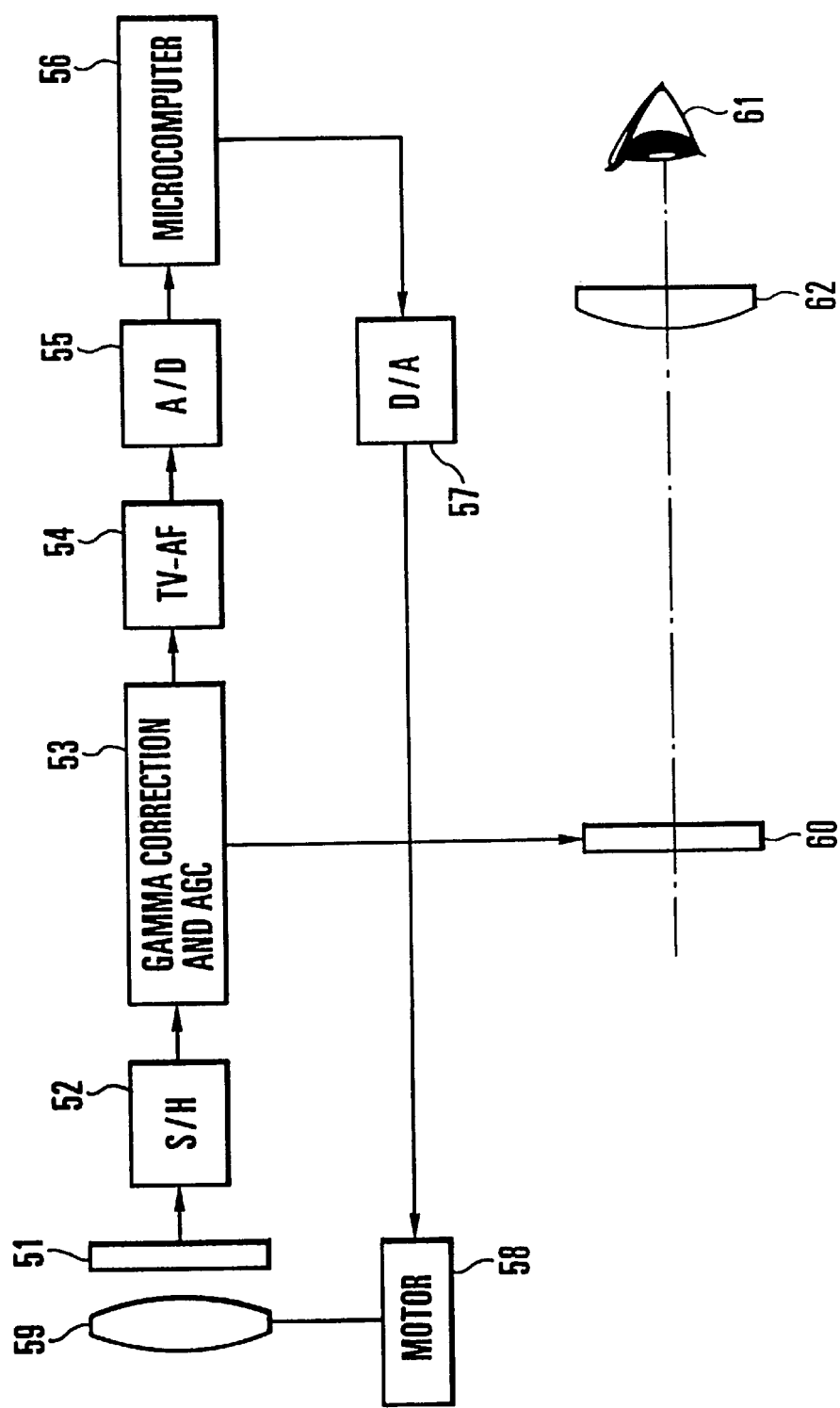
FIG. 1 is a block diagram showing the arrangement of a typical camera-integrated type VTR.
Figure 2:
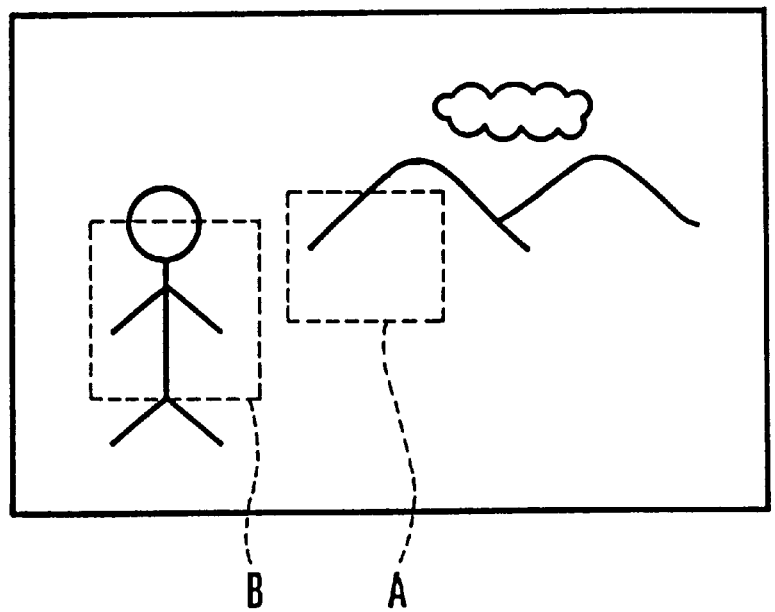
FIG. 2 shows the operation of the camera-integrated type VTR which is arranged as shown in FIG. 1.
Figure 3:
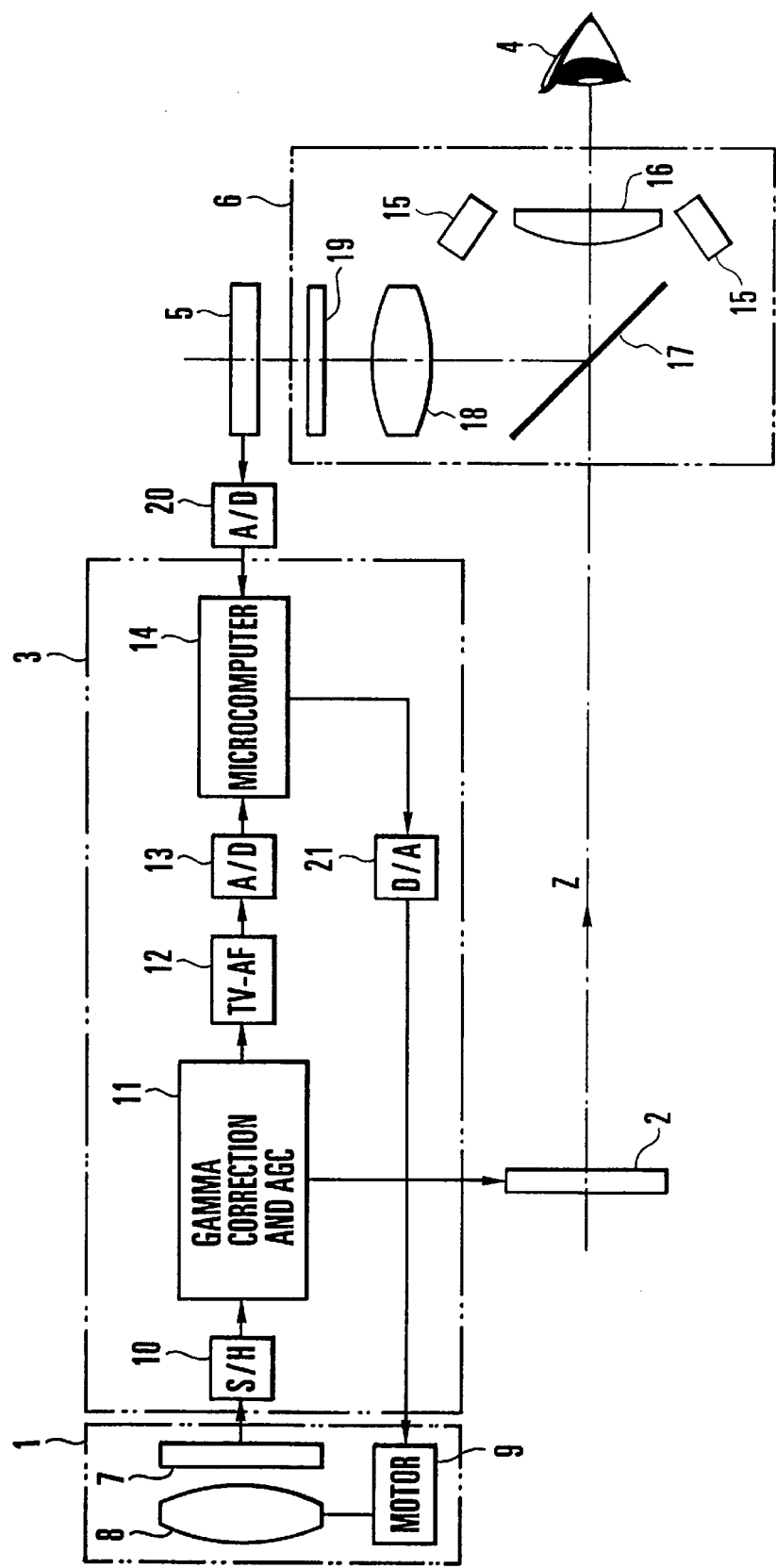
FIG. 3 is a block diagram schematically showing the concept of a camera-integrated type VTR which is arranged as a first embodiment of this invention.

Embodiments of this invention are described below with reference to the accompanying drawings:

FIG. 3 schematically shows the concept of a camera-integrated type video tape recorder (VTR) which is arranged as a first embodiment of this invention. The camera-integrated type VTR comprises parts arranged as follows: A photo-electric converting part 1 is arranged to form an optical image of an object of shooting (not shown) and to output a picked-up image signal by photo-electrically converting the optical image. An electronic viewfinder (EVF) 2 is arranged to permit monitoring the image picked up by the photo-electric converting part 1. A control part 3 is arranged to control the picked-up image signal outputted from the photo-electric converting part 1 and to feed back the controlled signal to the photo-electric converting part 1. The control part 3 also supplies a predetermined electrical signal to the EVF 2 for causing the EVF 2 to display the image picked up. A visual line detecting sensor 5 is composed of a bipolar type solid-state image sensor or the like which is arranged to sense the fixation point of an eye 4 of an operator of the VTR, that is, the position of a visual line of the eye 4. An optical system 6 is arranged to enable the visual line detecting sensor 5 to sense the visual line of the eye 4.

The photo-electric converting part 1 consists of a photo-electric converting element 7 which is a CCD or the like, a focusing lens 8 which is arranged to form the image of the object of shooting on the photo-electric conversion plane of the photo-electric converting element 7 and a motor 9 which is arranged to move the focusing lens 8 to bring the image of the object into an in-focus state on the photo-electric converting element 7.

The control part 3 mainly consists of a sample-and-hold (S/H) circuit 10 which is arranged to sample in a predetermined cycle and to hold the picked-up image signal outputted from the photo-electric converting element 7, a gamma correction and automatic gain control (AGC) circuit 11 which is arranged to gamma-correct the picked-up image signal outputted from the S/H circuit 10, to control the gain of the gamma-corrected signal and to supply a predetermined electrical signal to the EVF 2, a TV-AF circuit 12 which is arranged to extract a high frequency component of the video signal by carrying out processes such as differentiation, etc., on the signal outputted from the gamma correction and AGC circuit 11, to convert the high frequency component into an electrical signal indicating the state of blur of the image and to output the electrical signal as a focus evaluation value, and a microcomputer 14 which is arranged to receive, through an A/D converter 13, the signal outputted from the TV-AF circuit 12, i.e., the focus evaluation value.

The visual line detecting optical system 6 consists of a pair of illumination sources 15 including light emitting diodes (LEDs) or the like which are arranged to illuminate the eye 4 of the operator with light such as near-infrared rays, a lens 16, a half-mirror 17 which is arranged to pass and reflect transmission light passing through the lens 16, a lens 18 which is arranged to form the image of reflection light reflected by the half-mirror 17 on the visual line detecting sensor 5, and a visible light cutting filter 19 which cuts a visible light passing through the lens 18. A reflected image of the eye 4 of the operator formed by the visual line detecting optical system 6 is obtained on the visual line detecting sensor 5. The position of the visual line is computed by the microcomputer 14 from the reflected image of the eye 4. Further, the microcomputer 14 supplies to the EVF 2 a visual-line position display signal ED for displaying a predetermined mark so as to display (superimpose) on the EVF 2 the computed position of the visual line in real time. Incidentally, the number of the illumination sources 15 (light emitting diodes) need not be limited to two and may be one or three or more.

With the camera-integrated type VTR arranged as described above, the image of the object of shooting is converted into an electrical signal by the photo-electric converting element 7 and is outputted as a picked-up image signal. The picked-up image signal is sampled and held by the S/H circuit 10. The image signal sampled and held by the S/H circuit 10 is supplied to the gamma correction and AGC circuit 11. At the gamma correction and AGC circuit 11, the image signal is gamma-corrected and has its gain automatically controlled. The signal thus controlled is inputted to the TV-AF circuit 12 to be converted into a focus evaluation value which indicates the amount of blur of the image. The focus evaluation value is outputted as an analog signal, which is converted into a digital signal by the A/D converter 13. The digital signal is supplied to the microcomputer 14.

The microcomputer 14 finds the peak value of the focus evaluation values obtained for each of fields and supplies a driving signal through the D/A converter 21 to the motor 9 for driving the lens 8 in such a way as to increase the peak value.

In the visual line detecting optical system 6, on the other hand, the illumination light from the illumination sources 15 is applied to the eye 4 to obtain a reflection light. The reflection light from the eye 4 is sensed by the visual line detecting sensor 5 through the lens 16, the half mirror 17, the lens 18 and the visible light cutting filter 19. As a result, the visual line detecting sensor 5 outputs an electrical (analog) signal. The electrical signal is converted by the A/D converter 20 into a digital signal. The digital signal is inputted to the microcomputer 14. In other words, the direction of the visual line of the eye 4 of the operator is detected by the visual line detecting sensor 5 from cornea reflection images of the eye 4, etc. The data thus obtained is inputted to the microcomputer 14. The microcomputer 14 then sets a focusing area for obtaining the focus evaluation value at the visual line position within the image plane. In other words, the direction in which the lens 8 is to be driven is determined by deciding the state of focus on the basis of the focus evaluation value obtained for this visual line position. After that, a signal (digital signal) from the microcomputer 14 is converted into an analog signal by the D/A converter 21. The motor 9 is controlled by this signal to bring the lens 8 to a desired position where an in-focus state is obtained on the photo-electric converting element 7. The focusing area of the object of shooting is thus decided according to the direction of the visual line of the eye 4 of the operator. Focus adjustment is made on the basis of the focus evaluation value obtained for this focusing area.

Figure 4A:
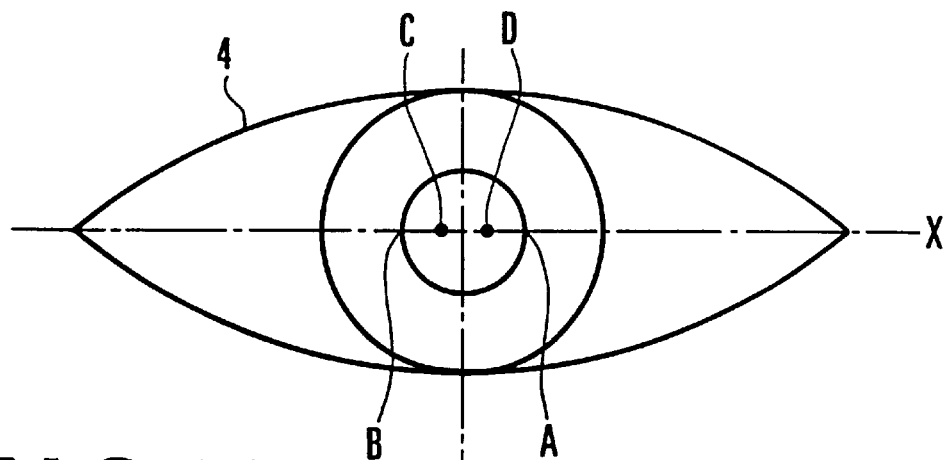
FIGS. 4(a) and 4(b) show the operating principle of a visual line detecting sensor.
Figure 4B:
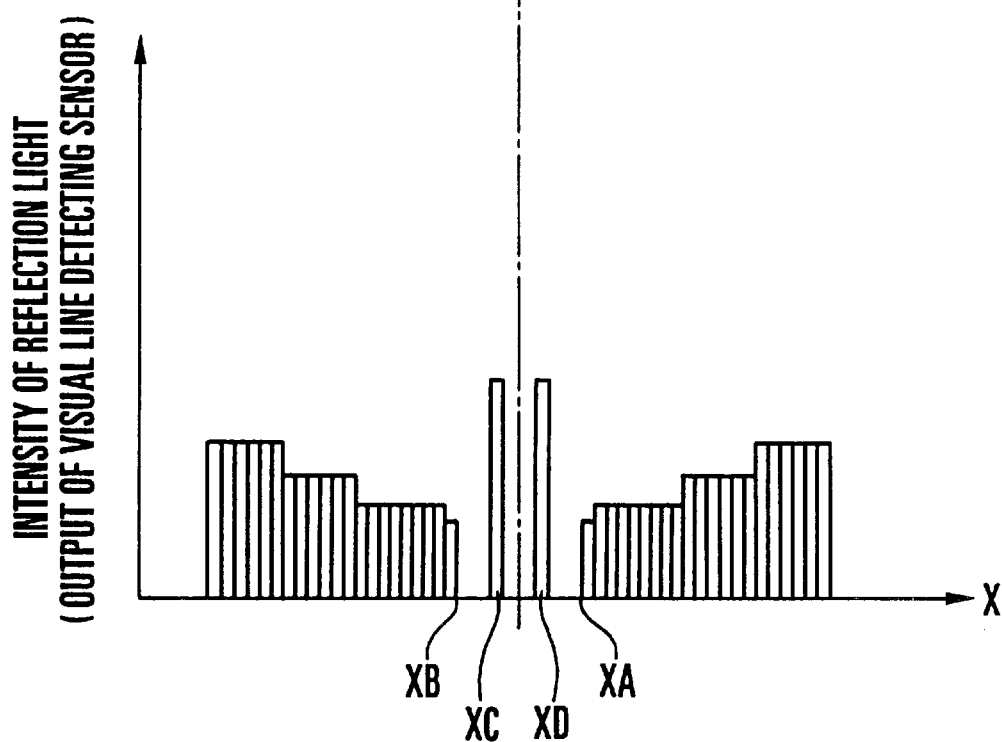

FIGS. 4(a) and 4(b) show the principle of the the detection of the visual line direction by the visual line detecting sensor 5. In FIG. 4(a), which shows the eye 4 of the operator, reference symbols A and B denote the edges of the iris of the eye 4. Symbols C and D denote the reflected images from the cornea due to the spot lights coming from the illumination sources 15. FIG. 4(b) shows the intensity of the reflection light coming from the eye 4. The intensity values at the positions XA to XD correspond respectively to the points A to D in FIG. 4(a).

In order to find the direction of the visual line, first, the distance to the eye of the operator is obtained by measuring the distance between the positions XC and XD. Secondly, the distance of rotation of the eye of the operator is obtained by measuring the distances between the positions XB and XC and between the positions XA and XD. The rotational angle of the eye of the operator is computed from the two obtained distances, and is thus regarded as the direction of the visual line. As described above, it is necessary to compute image information as distance information for obtaining the direction of the visual line. However, an approximate direction of the visual line may be obtained by detecting a point where the reflection light has a maximum intensity value.

As apparent from FIG. 4(b), at the positions XC and XD where the intensity of the reflection light reaches a maximum value, the output of the visual line detecting sensor 5 shows also a maximum value. The direction of the visual line, therefore, can be found by detecting the position where the signal outputted from the visual line detecting sensor 5 becomes a maximum value.

Figure 5:
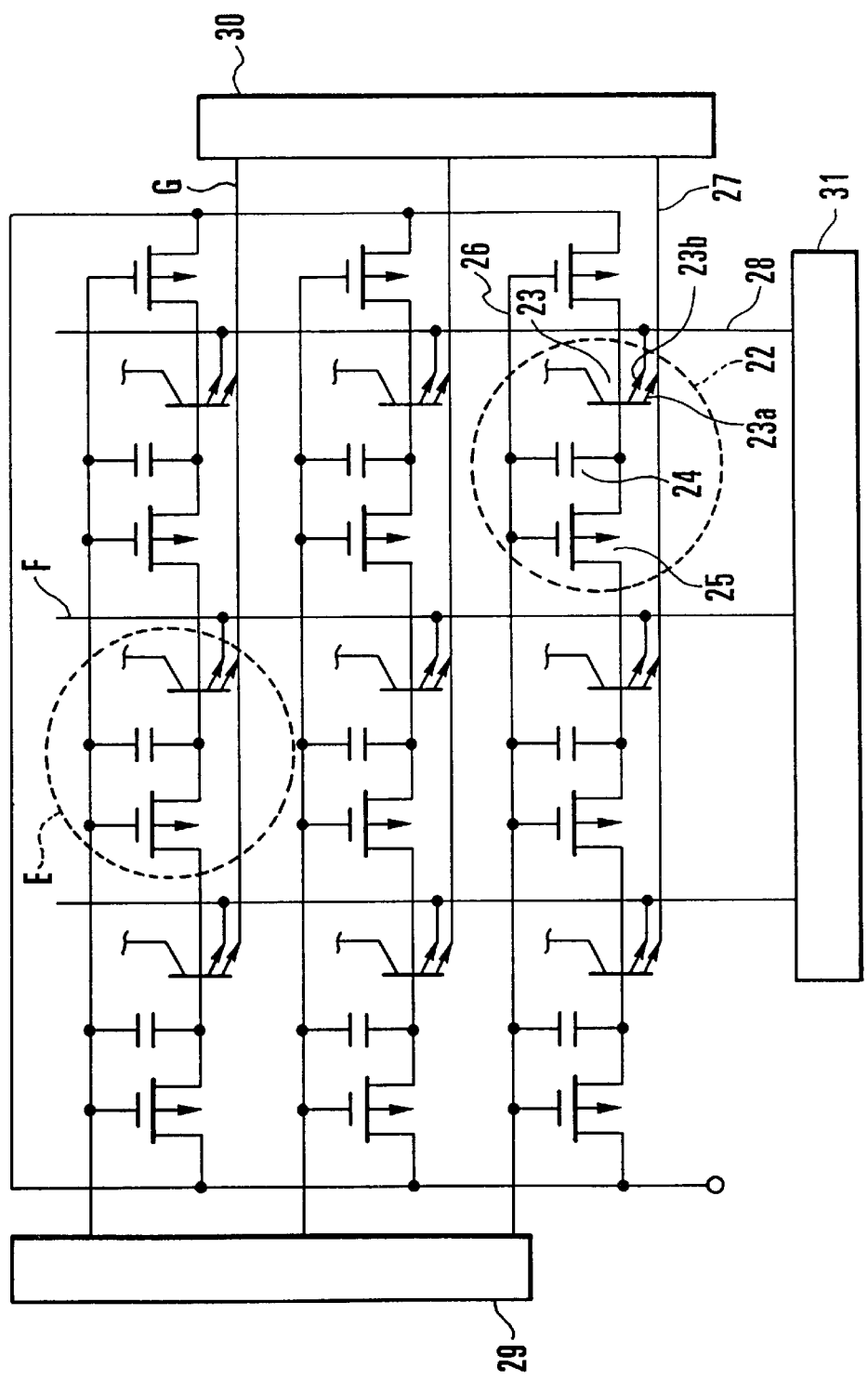
FIG. 5 is an electric circuit diagram showing by way of example the equivalent circuit of a bipolar type solid-state image sensor which is employed as the visual line detecting sensor.

FIG. 5 is an electric circuit diagram showing as an equivalent circuit the bipolar solid-state image sensor employed as the visual line detecting sensor 5. The visual line detecting sensor 5 is composed of many picture elements (six in the case of this embodiment) 22 which are vertically and horizontally arranged in a matrix shape.

The details of the visual line detecting sensor 5 are as follows: Each of the picture elements 22 includes a bipolar transistor 23 having two emitters 23a and 23b, a capacitor 24 which is arranged to control the base potential of the bipolar transistor 23, an MOS type transistor 25 which is arranged to reset the base potential of the bipolar transistor 23, a horizontal driving line 26 which is arranged to drive each picture element by connecting the capacitor 24 and the MOS type transistor 25 to each other, a horizontal output line 27 which is connected to one emitter 23a of the bipolar transistor 23, and a vertical output line 28 which is connected to the other emitter 23b of the bipolar transistor 23. Each of the horizontal driving lines 26 of the picture elements 22 is connected to a horizontal driving circuit 29. Each of the horizontal output lines 27 of the picture elements 23 is connected to a horizontal potential sensing circuit 30. Further, each of the vertical output lines 28 of the picture elements 22 is connected to a vertical potential sensing circuit 31.

At the visual line detecting sensor 5, while each picture element 22 is storing photo-electric charge in the base area of the bipolar transistor 23, both the base and the emitters of the bipolar transistor 23 are in a floating state. The potential of each output line becomes a value corresponding to the base potential of one picture element having the largest stored amount of photo-electric charge and, thus, the highest base potential value among all the picture elements connected to the output line. For example, when the spot light images of the illumination sources 15 are formed on the picture element E in FIG. 5, the vertical output line F shows the highest potential among the vertical output lines 28 and the horizontal output line G shows the highest potential among the horizontal output lines 27.

With the bipolar type solid-state image sensor used as detecting means in combination with the illumination sources 15, the maximum position of the output potential of the visual line detecting sensor 5 can be sensed while the storing action is in process before a reading action is performed on the visual line detecting sensor 5. Therefore, the direction of the visual line of the eye 4 of the operator can be quickly detected.

Figure 6:
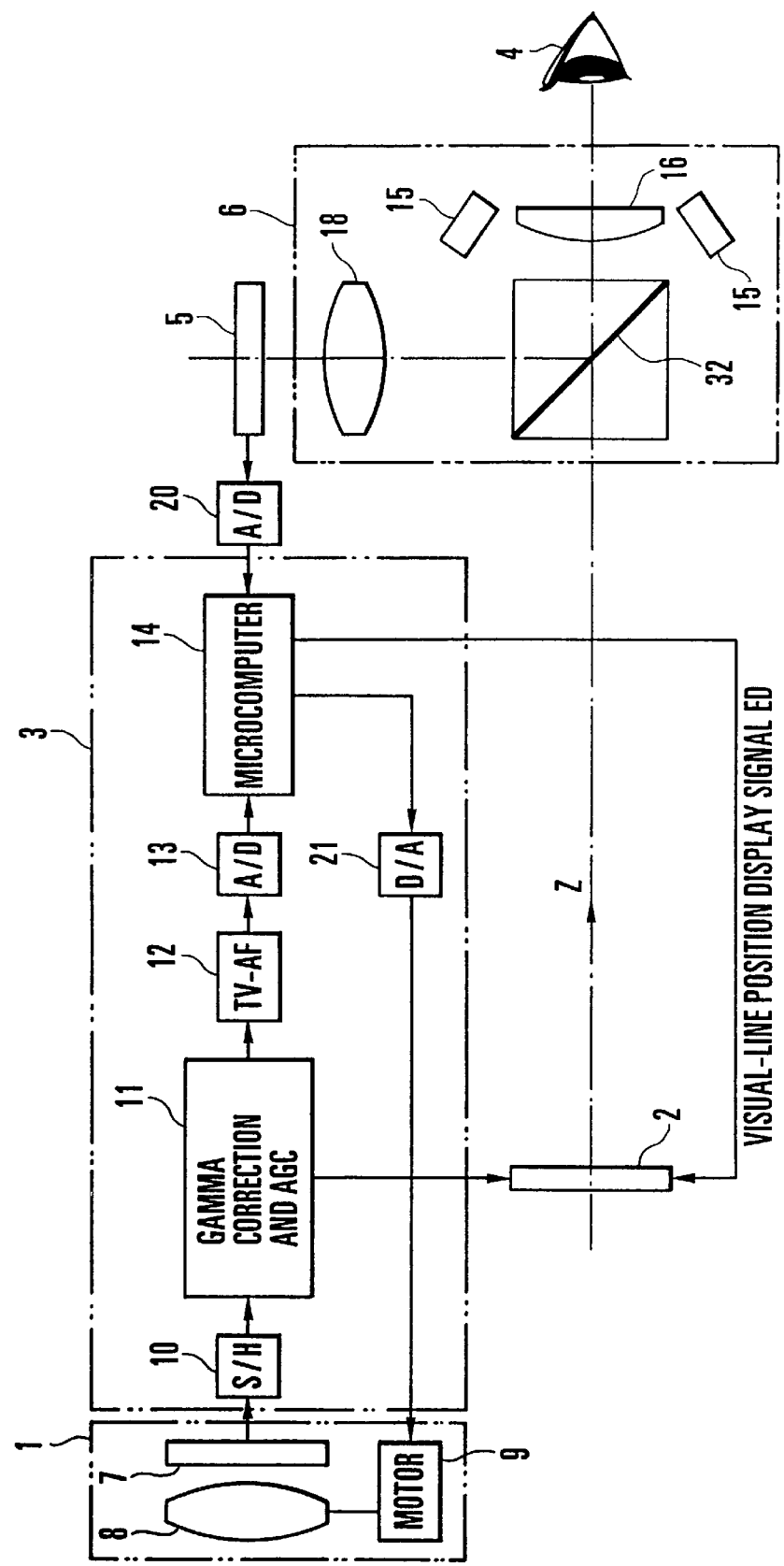
FIG. 6 is a block diagram schematically showing the concept of a camera-integrated type VTR which is arranged as a second embodiment of this invention.

FIG. 6 schematically shows the concept of a camera-integrated type VTR which is arranged as a second embodiment of this invention. The second embodiment differs from the first embodiment in that a polarizing beam splitter 32 is used in place of the half mirror 17 in the first embodiment and that the visible light cutting filter 19 is omitted. With the exception of these points, the arrangement and the operation of the second embodiment are the same as the first embodiment described above.

The light which is forming a video image at the EVF 2 is polarized in a specific direction as it passes through a polarizing plate. The same advantageous effect as that of the first embodiment is, therefore, attainable by arranging on an optical axis Z the polarizing beam splitter 32 which transmits 100% of light coming from the EVF 2.

With the polarizing beam splitter 32 arranged to transmit 100% of light from the EVF 2, no loss takes place in the quantity of light before the image obtained at the EVF 2 reaches the eye 4. Further, the illumination light of the illumination sources 15 is randomly polarized. Only half of the reflection light from the eye 4 thus reaches the visual line detecting sensor 5. However, since the reflection light is invisible light, the image obtained at the EVF 2 is never affected by that loss. Besides, since the visible light from the EVF 2 completely passes through the polarizing beam splitter 32 without any reflection, the arrangement of the second embodiment obviates the necessity of use of the visible light cutting filter.

Figure 7:
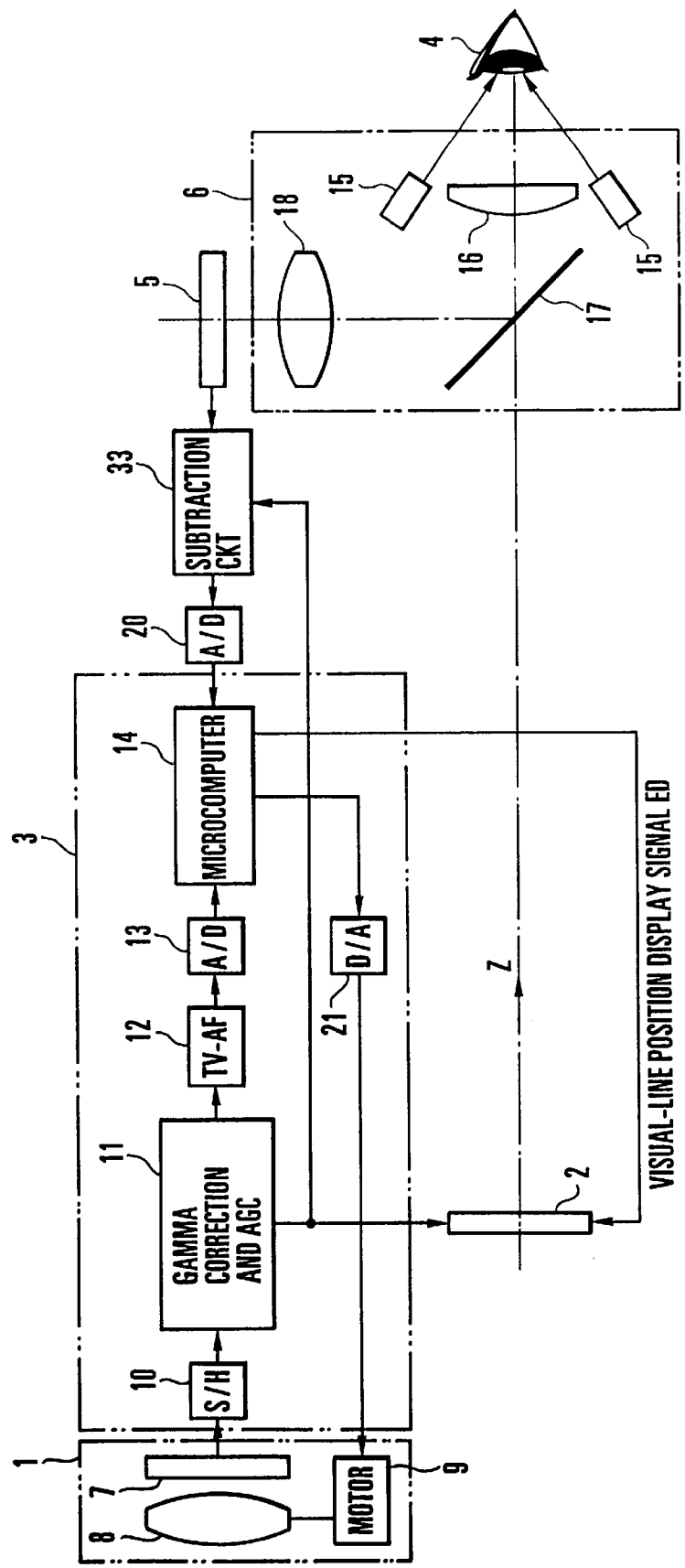
FIG. 7 is a block diagram schematically showing the concept of a camera-integrated type VTR which is arranged as a third embodiment of this invention.

FIG. 7 schematically shows the concept of a camera-integrated type VTR which is arranged as a third embodiment of this invention. The third embodiment is arranged in the same manner as the first embodiment except that a subtraction circuit 33 is inserted in between the visual line detecting sensor 5 and the microcomputer 14. The signal outputted from the visual line detecting sensor 5 and the signal outputted from the gamma correction and AGC circuit 11 are inputted to the subtraction circuit 33.

An image of the object of shooting is formed on the photo-electric converting element 7. A video image thus obtained is sent to the EVF 2 to be observed through the eyepiece lens 16. The light of the illumination sources 15 with which the eye 4 of the operator is illuminated is, on the other hand, reflected by the eye 4 and is inputted to the visual line detecting sensor 5 through the half-mirror 17 and the lens 18. An image to be taken into the visual line detecting sensor 5 is a composite image consisting of the image of the object and an image of the eye 4 obtained with the illumination light reflected by the eye 4. The composite image is inputted to the subtraction circuit 33. The video signal representing the object image is inputted also to the subtraction circuit 33 from the gamma correction and AGC circuit 11. The subtraction circuit 33 then performs a subtracting operation on the two input signals. As a result, only the image of the eye 4 of the operator is taken into the microcomputer 14. At the microcomputer 14, information on the visual line of the operator is extracted from the image of the eye 4. The accuracy of the visual line detection is thus enhanced. Further, since the picked-up image is cancelled, the third embodiment is thus arranged to obviate the necessity of use of infrared rays which are invisible. Therefore, the eye is never damaged by being illuminated with the infrared rays.

Further, in the case of the third embodiment, the number of picture elements of the photo-electric converting element 7 is preferably the same as that of the visual light detecting sensor 5 which is arranged to receive the reflection light from the eye 4. However, the numbers of picture elements do not have to be the same. This is because, in a case where the number of picture elements of the photo-electric converting element 7 is not the same as that of the visual line detecting sensor 5, one of the video signals obtained from these sensors is subtracted from the other by sampling the output of one of the sensors which has a larger number of picture elements according to the sampling frequency of the other sensor which has a smaller number of picture elements.

Each of the camera-integrated type VTRs which are arranged as the first, second and third embodiments of this invention, as described in detail above, is provided with the visual line sensing means for sensing the direction of the visual line of the eye of the operator and the optical system which is arranged to guide the reflection light from the eye of the operator to the visual line sensing means. Meanwhile, the control part includes focusing means which is arranged to control the focusing area on the object image on the basis of the result of sensing by the visual line sensing means. Each of these embodiments is, therefore, capable of carrying out an automatic focusing action on the video image area which is determined according to the visual line.

Further, the embodiment is provided with the extracting means for extracting the reflection light signal from the composite signal which consists of the video signal representing the object of shooting and the reflection light signal formed by the reflection light from the eye of the operator. The extracting means enables the visual line detecting optical system to be simply arranged. Further, the arrangement of the embodiment eliminates the possibility of damaging the eye due to the light from the illumination sources, etc.

Fourth, fifth and sixth embodiments of this invention are arranged as described below:

Numerous camera-integrated type VTRs are on the market at present and are expected to further increase their popularity in future. The camera-integrated type VTRs are arranged to have an automatic focusing (AF) function in general. This function is carried out by known methods including, for example, an active type AF method of illuminating an object of shooting with infrared rays and detecting the reflection of the infrared rays, a TV-AF method of carrying out focusing in such a way as to increase the rate of contrast of the image of the object.

According to the conventional arrangement of the camera-integrated type VTR having the AF function, however, it is difficult to adequately carry out an AF action on a desired part in the event of a complex situation where there are many persons or objects or where objects are scattered at far and near distances. Another problem with the conventional arrangement lies in that, while an area for which the AF action is performed is located in the middle part of the image plane in most cases, if a part most desired by the operator happens to be located at one end part of the image plane, the camera must be moved against a picture composition intended.

A fourth embodiment of this invention is contrived to solve the above-stated problems. A camera-integrated type VTR which is the fourth embodiment is arranged to facilitate automatic focusing (AF) on any desired area and also to improve its display image plane to a great extent. For this purpose, the camera-integrated type VTR having photo-electric converting means for converting an optical image of the object of shooting into an electrical signal and a viewfinder for displaying the object image represented by the electrical signal is arranged to include specific area selecting means for selecting a specific area in the object image while causing an operator to view the specific area, and focusing means for performing a focusing action on the specific area selected by the specific area selecting means and causing the viewfinder to display an image corresponding to the specific area.

The fifth embodiment of this invention which is arranged in the same manner as the fourth embodiment is further provided with visual line sensing means for sensing the direction of a visual line of the operator. In this case, the above-stated specific area selecting means is arranged to select the specific area on the basis of the direction of the visual line of the operator sensed by the visual line sensing means.

The sixth embodiment of this invention which is arranged in the same manner as the fourth embodiment or the fifth embodiment is further provided with display means for displaying the specific area of the object image and the whole area of the object image together in a multiple window form in the viewfinder.

The arrangement of each of these embodiments permits confirmation of the AF action on the specific area selected. The AF confirmation can be made either by enlarging the specific area or in a multi-window form at the viewfinder.

Figure 8:
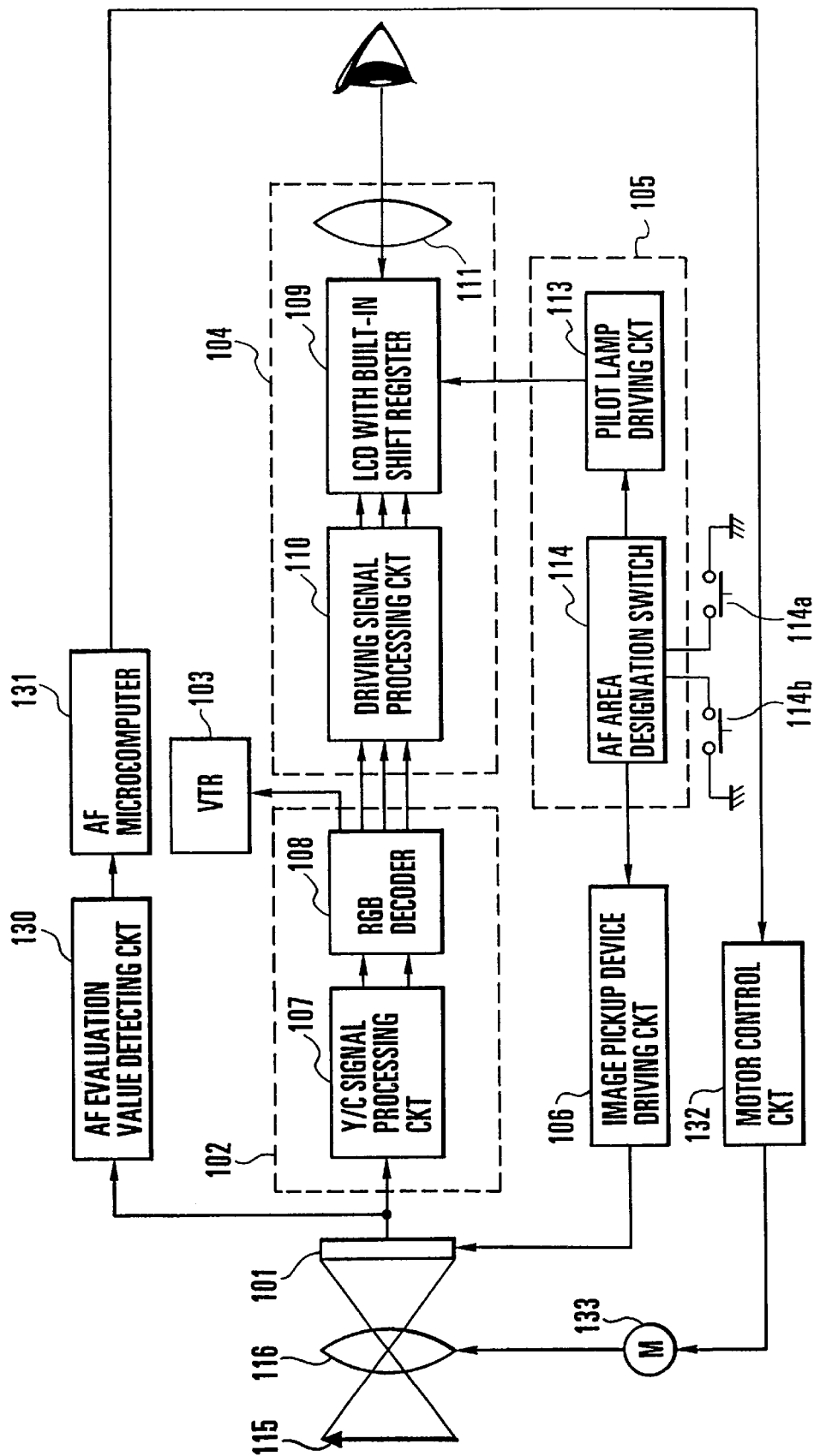
FIG. 8 is a block diagram schematically showing the arrangement of a camera-integrated type VTR which is arranged as a fourth embodiment of this invention.

FIG. 8 is a block diagram schematically showing the arrangement of the camera-integrated type VTR which is the fourth embodiment of this invention. The camera-integrated type VTR includes parts arranged as follows: An image pickup device 101 which is composed of a CCD or the like is arranged not only to convert an optical image of an object of shooting into an electrical signal but also to have an electronic zooming function of varying the range of image reading as desired. A signal processing part 102 is arranged to process the electrical signal outputted from the image pickup device 101. A VTR 103 is arranged to record the output of the signal processing part 102. An electronic viewfinder part 104 is arranged to display an image represented by the output signal of the signal processing part 102. A specific area selecting part 105 is arranged to select a specific area for focusing within the picked-up image plane. An image pickup device driving circuit 106 is arranged to supply a driving signal to the image pickup device 101 so as to focus on the specific area selected by the specific area selecting part 105. The above-stated electronic zooming function is carried out with the range and speed of reading from the image pickup device 101 controlled by the image pickup device driving circuit 106.

The signal processing part 102 includes a Y/C signal processing circuit 107 which is arranged to receive the electrical signal, i.e., a video signal, from the image pickup device 101 and to process the video signal by dividing it into a luminance signal Y and a chrominance signal C, and an RGB decoder 108 which is arranged to separate the output of the Y/C signal processing circuit 107 into signals R (red), G (green) and B (blue).

Figure 9:
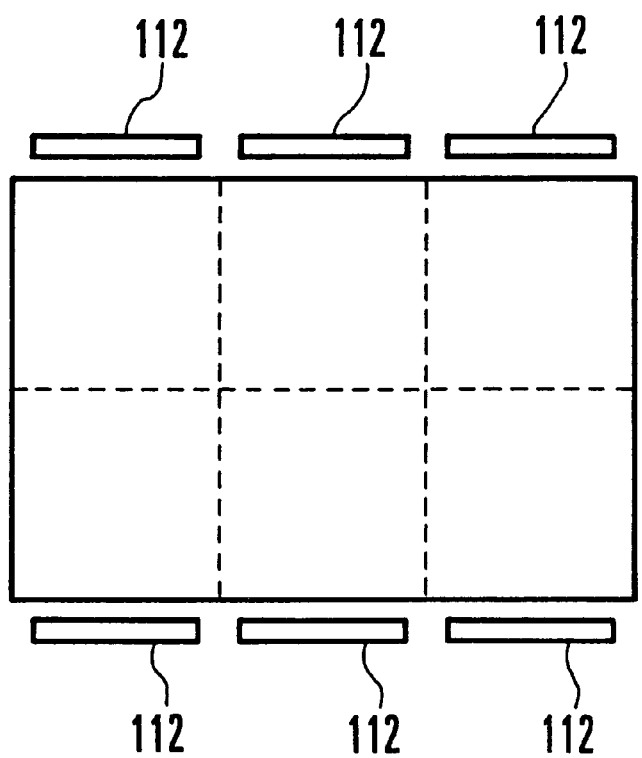
FIG. 9 shows the arrangement of pilot lamps.

Further, the electronic viewfinder part 104 which is arranged to display a picked-up image signal outputted from the signal processing part 102 consists of a liquid crystal display device (LCD) 109 having a built-in shift register, a driving signal processing 110 which is arranged to drive the LCD 109 according to the signal outputted from the the RGB decoder 108, and a viewfinder eyepiece 111 which is arranged to form the image of the object of shooting on the LCD 109. As shown in FIG. 9, the LCD 109 is divided into six parts corresponding to six slectable focus detecting areas, in the case of this embodiment, and is provided with pilot lamps 112 which are arranged along the peripheral parts of the divided parts corresponding to the selectable focus detecting areas.

The specific area selecting part 105 is composed of a microcomputer, etc., including a pilot lamp driving circuit 113 which is arranged to drive the pilot lamps 112 to be serially lighted for the above-stated areas one after another and an AF area designation switch 114 which is provided for instructing the pilot lamp driving circuit 113 to drive the pilot lamps 112 and also for designating as an AF area the area for which the pilot lamp is lighted. The image pickup device driving circuit 106 is arranged to be caused by the AF area designating switch 114 to drive the image pickup device 101 in such a way as to read out a picked-up image signal obtained in the selected AF area. The focus detection is accomplished by this arrangement.

Further, in reading out from the image pickup device 101 only the picked-up image signal obtained in the selected AF area, the so-called electronic zooming is carried out to electronically enlarge an image by reading out the image formed within the selected AF area in such a way as to make the size of the image into an ordinary image plane size. The rate of enlargement by the electronic zooming would be unvaryingly determined if the image of the AF area selected is read out to become the full size of the image plane. However, if the image obtained within this specific AF area does not have to be displayed in the full image plane size, the rate of enlargement can be set otherwise as desired.

In a case where the image obtained within an AF area selected is read out at a low speed from the image pickup device 101 in such a way as to enlarge its size into the full image plane size, an image signal thus read out is in a state of being thinned down between the picture elements in the horizontal direction and between scanning lines in the vertical direction. In this state, therefore, the displayed image is compensated for the dropout and lack of information, for example, by average value interpolation or the like, using adjoining picture elements and adjoining scanning lines.

The AF control is performed as follows: The picked-up image signal outputted from the image pickup device 101 is supplied to an AF evaluation value detecting circuit 130. A high frequency component of the picked-up image signal which varies within the picked-up image signal according to the state of focus is extracted from the picked-up image signal. The peak value of the high frequency component obtained in every one-field period is detected and outputted as a focus evaluation value. The peak value is supplied to an AF microcomputer 131. At the AF microcomputer 131, the direction of driving a lens 116 in which the focus evaluation value increases and a lens driving speed are computed by comparing the current peak value with the previous peak value. The result of computation is supplied to a motor control circuit 132. A motor 133 is driven accordingly to make focus adjustment.

The image obtained in a selected AF area within the image plane thus can be displayed in an enlarged state and the lens can be focused on the image of the selected AF area.

With the camera-integrated type VTR arranged as described above, a light signal from the object comes through the lens 116 to be incident on the image pickup device 101. The light signal incident on the image pickup device 101 is photo-electrically converted into an electrical signal. The electrical signal is inputted to the Y/C signal processing circuit 107. The Y/C signal processing circuit 107 separates the input signal into a luminance signal Y and a chrominance signal C. The signals Y and C are supplied to the RGB decoder 108 to be separated by colors. The color-separated signals are inputted to the driving signal processing circuit 110. The output of the driving signal processing circuit 110 is supplied to the LCD 109 to drive the LCD 109 accordingly. When the AF area designation switch 114 is pushed, on the other hand, the pilot lamp driving circuit 113 drives the LCD 9 to cause the pilot lamps 112 for the respective AF area to be lighted one after another. Then, if a selection switch 114a which is disposed within the AF area designation switch 114 is pushed and turned on when the pilot lamp 112 of a desired AF area comes to be lighted, information on the address of this specific area is inputted to the image pickup device driving circuit 106. This input actuates the electronic zooming mechanism of the image pickup device 101. Then, information on the video image of the image pickup device 101 is sent to the LCD 109 to be displayed in a state of being elarged.

The method of operating the electronic zooming mechanism is not limited to any particular method. In one method, the electrical signal obtained from the image pickup device, for example, in conformity with the NTSC system is temporarily stored in a frame memory and to read it out only for a desired area at a low speed. In another method, some picture element scanning area of the image pickup device 101 is considered to correspond to a designated area and an output obtained from this area of the image pickup device 101 is directly zoomed up.

In a case where no AF area is to be selected, the AF action is carried out with a fixed AF area of a predetermined size set in the middle part of the image plane by the AF microcomputer 131.

FIGS. 10(a) to 10(f) show image information obtained on the LCD 109 and image information to be recorded by the VTR 103. In the case illustrated, one person is located at a right corner of the image. All other parts of the image are considered to be a background image. In shooting in a normal AF mode, as shown in FIG. 10(a), the background image is in focus and the person is out of focus. When the AF area designation switch 114 is pushed, the pilot lamps 112 provided within the LCD 109 are lighted for the AF areas one after another, as shown in FIGS. 10(b) and 10(c).

With the pilot lamps 112 lighted for the AF areas one after another, if the selection switch 114a which is included in the AF area designating switch 114 is pushed when the pilot lamp of a desired area (6) is lighted as shown in FIG. 10(d), this area (6) is zoomed up to be in an enlarged state on the LCD 109 as shown in FIG. 10(e). The AF action is performed on this area. Any desired area of the image within the image plane thus can be zoomed up during the process of shooting. A multi-function shooting operation can be carried out according to the state thus displayed. The zoomed-up state of the image plane can be brought back to the original state by again operating the AF area selection switch 114. If this function is to be used only for AF (automatic focusing), the embodiment may be arranged to have the video image come back to the original state, with the lens focused on the person (the main object), when a predetermined period of time, say, 5 sec, has elapsed after completion of the AF action as shown in FIG. 10(f). The video image to be recorded by the VTR 103 through the series of the above-stated actions may be either an image displayed on the LCD 109 or the whole image.

In addition, the above-stated image enlarging function may be used not only for the AF action but also for another action such that an image at the arbitrary position in the image plane is arbitrarily selected by a switch 114b and instantaneously enlarged in response to the operation of the switch 114a, and the original image plane can be resumed by pressing the switch 114a again. Accordingly, a multi-function shooting operation can be attained.

Incidentally, in the above-stated embodiment, the image plane is divided into six selected areas and one of the selected areas is indicated by a corresponding one of the LEDs 112. However, this invention is not limited to such an arrangement. The image plane may be divided into more than or less than six selected areas. The indication of one of the selected areas may be made, instead of the LEDs, by varying the contrast of the selected area, by changing a color thereof, or by displaying a pattern (mesh pattern).

Figure 11:
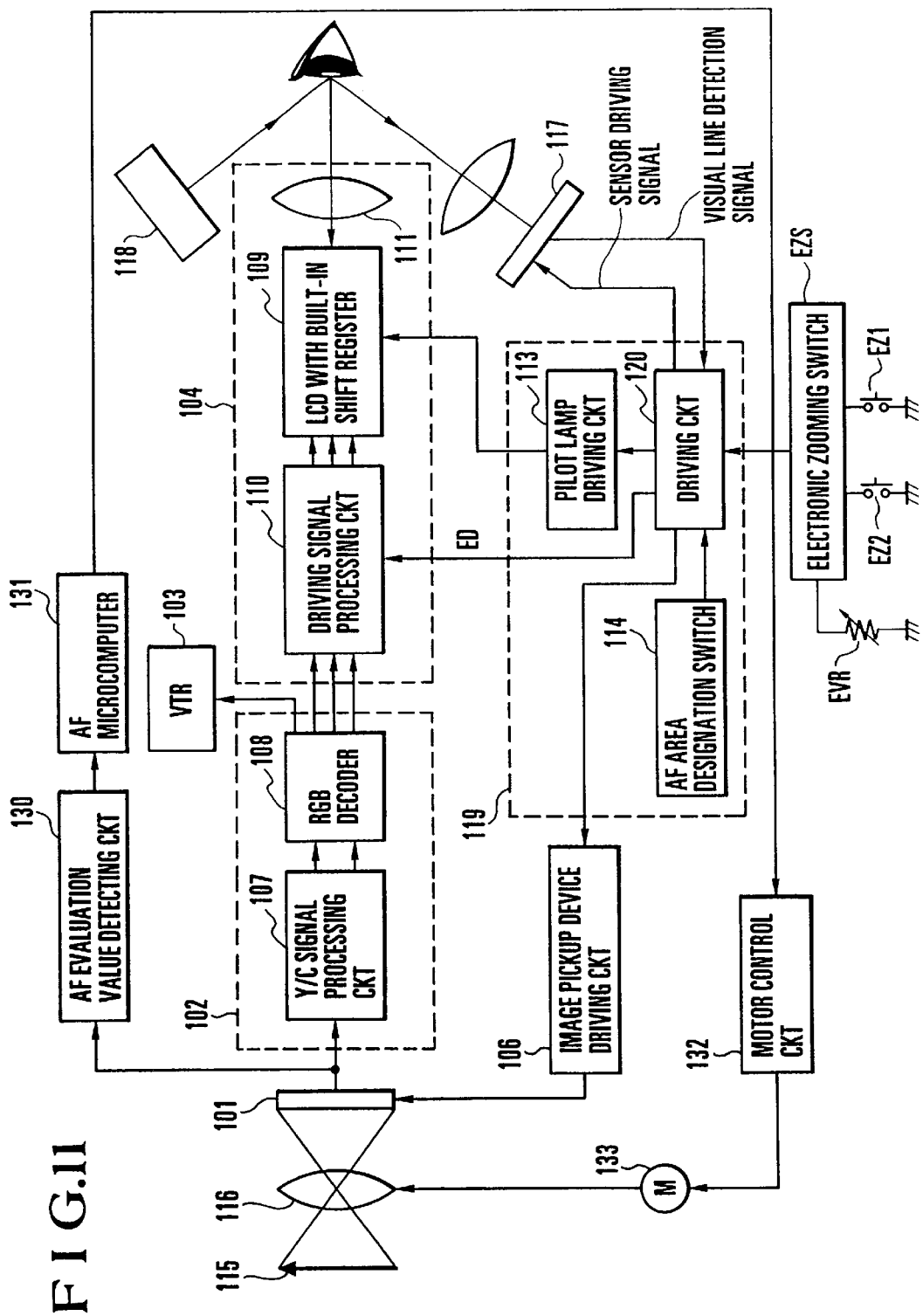
FIG. 11 is a block diagram schematically showing the arrangement of a camera-integrated type VTR which is arranged as a fifth embodiment of this invention.
Figure 12A:
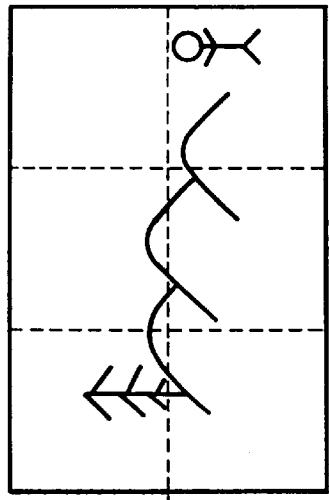
FIGS. 12(a) to 12(d) show image information on an LCD and image information to be recorded by the VTR of the fifth embodiment of this invention.
Figure 12B:
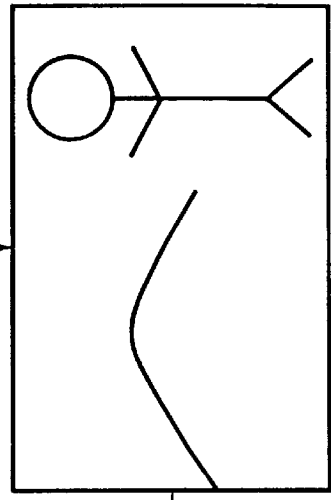
Figure 12D:
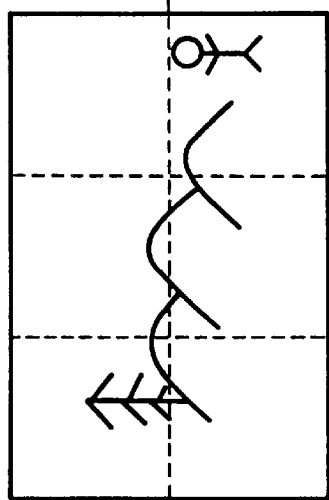
Figure 12C:
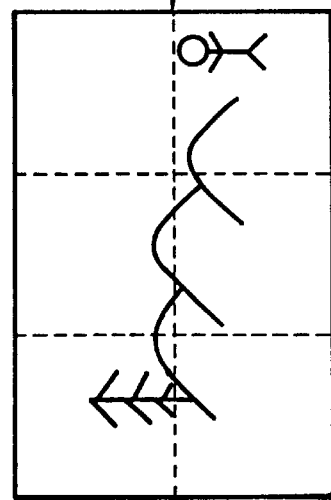

FIGS. 11 and 12(a) to 12(d) show a camera-integrated type VTR which is arranged as the fifth embodiment of this invention. FIG. 11 is a block diagram of the fifth embodiment. FIGS. 12(a) to 12(d) serially show the details of the AF action of the fifth embodiment. In FIG. 11, the component parts of the fifth embodiment which are the same as those of the fourth embodiment shown in FIG. 4 are indicated by the same reference numerals and the details of them are omitted from the following description.

While the fourth embodiment described in the foregoing is arranged to select an AF area by operating the selection switch, the fifth embodiment is provided for selecting the AF area with the following parts in addition to the parts of the fourth embodiment: Referring to FIG. 11, a visual line sensor 117 is arranged for detecting the direction of the visual line of the operator who is viewing the LCD 109. A light emitting diode (LED) 118 or the like is arranged as an illumination source to illuminate the eye of the operator. In combination with these parts 117 and 118, a specific area selecting part 119 is provided with a driving circuit 120 which is arranged, in addition to the pilot lamp driving circuit 113 and the AF area designation switch 114, to drive the visual line sensor 117 and the illumination source 118 and to detect the position of the visual line by receiving an output of the visual line sensor 117. The visual line sensor 117 and the illumination source 118 are caused to operate when the AF area designation switch 114 is pushed. The visual line sensor 117 then detects, on the basis of the above-stated principle of visual line detection, the direction of the visual line from a reflection light coming from the eye of the operator as a result of light emission from the illumination source 118. It should be noted that, also in the fifth embodiment, the position of the visual line can be displayed in the image plane in response to the visual-line position display signal ED.

The driving circuit 120 forms an area address corresponding to the visual line position on the basis of the output of the visual line sensor 117, and causes the pilot lamp 112 corresponding to that area address to be lighted. At the same time, an address signal indicating that area address is sent to the image pickup device driving circuit 106. In accordance with the address signal, the image pickup device 101 performs the electronic zooming function. By this function, the AF action is carried out on a specific area and the image is enlarged in the same manner as in the case of the fourth embodiment. When the AF area selection switch 114 is operated again, or when a predetermined period of time, say, five sec, has elapsed, the operation of the embodiment comes back to a normal mode. This method enables the embodiment to designate the area for which the AF action is to be performed according to the visual line direction and the operator to confirm the accuracy of the AF action through a zoomed-up image.

Further, in the case of the fourth embodiment, in performing the AF action for an area included in the areas divided as shown in FIG. 9, a certain period of time may be required, according to the position of the object at which the operator is looking, until the AF action is actually performed after the AF area designating switch 114 is pushed. The fifth embodiment solves this problem as the fifth embodiment is arranged to detect the visual line by the visual line sensor 117 and to automatically zoom this specific area for the AF action and the image pickup action.

Further, in the VTR shown in FIG. 11, the image enlarging function is used not only for the AF action but also for the electronic zooming function, so that a multi-function shooting operation can be attained. More specifically, the visual-line detecting function and the electronic zooming function are made operative by pushing a switch EZ1 included in an electronic zooming switch EZS and are turned off by pushing the switch EZ1 again. When the electronic zooming function is operative, if a switch EZ2 included in the electronic zooming switch EZS is pushed, the electronic zooming is performed such that an image is enlarged at a predetermined magnification with the position of the visual line as the center of enlargement. Accordingly, the image the operator is viewing can be electronically enlarged. Further, if the switch EZ2 is again pushed in such a state, the original image is resumed. It should be noted that the position of the visual line is displayed in the image plane in response to the visual-line position display signal ED also in the above-state electronic zooming. The zoom magnification can be beforehand determined by operating a variable resistor EVR.

Furthermore, the electronic zooming function may be made operative by using an input means such as a voice input unit, or by utilizing an arrangement in which a switch is turned on or off according to the gazing of the operator at a specific area in the image plane.

Figure 13:
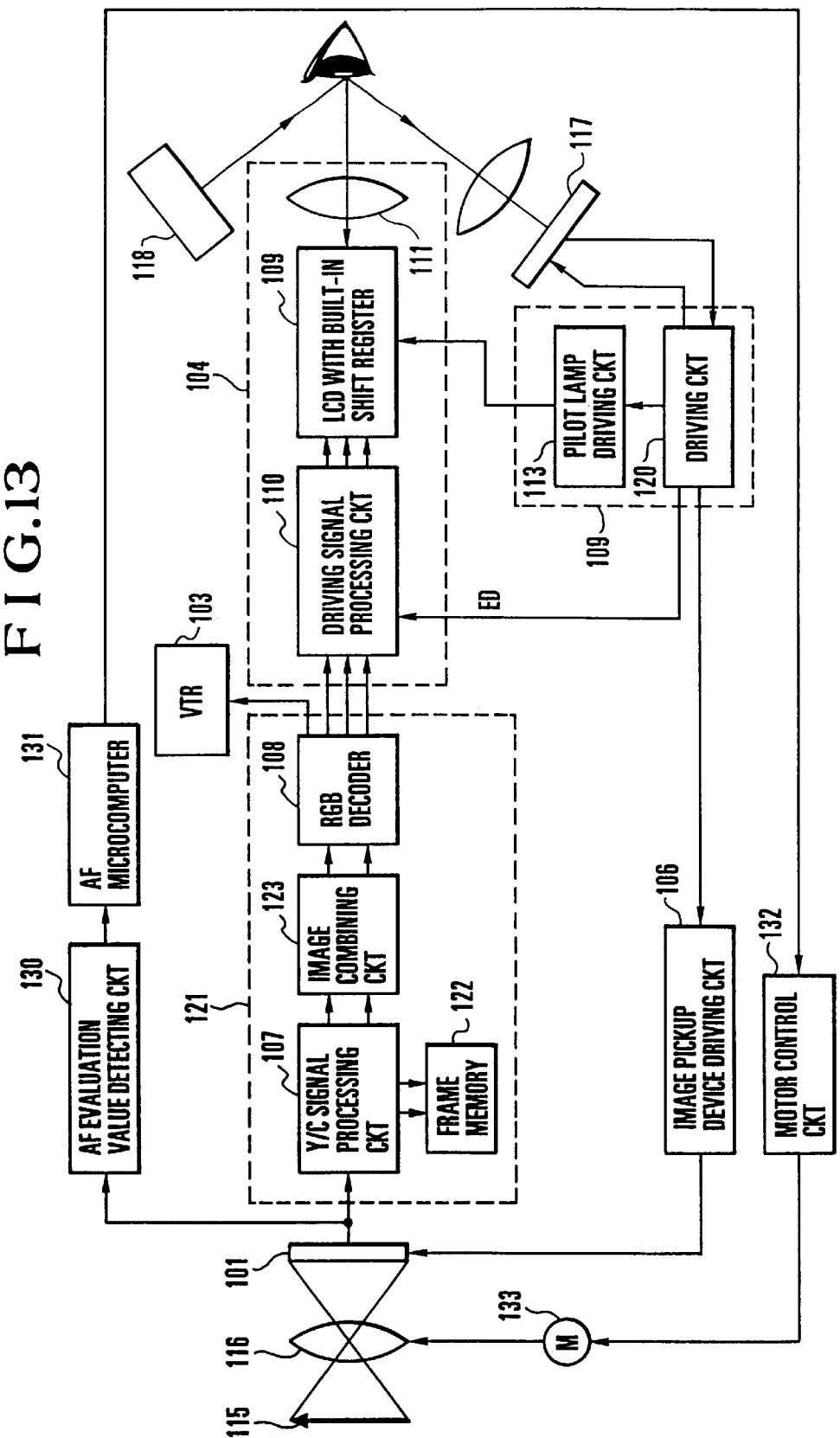
FIG. 13 is a block diagram schematically showing the arrangement of a camera-integrated type VTR which is arranged as a sixth embodiment of this invention.

FIG. 13 shows in a block diagram a camera-integrated type VTR arranged as the sixth embodiment of this invention. The sixth embodiment is arranged also in the same manner as the fourth or fifth embodiment described above except the following point: A signal processing part 121 is provided with a frame memory 122 and an image combining circuit 123 for making a multi-window display at the LCD 109. In FIG. 13, the same component parts as those of the fourth and fifth embodiments are indicated by the same reference numerals.

In the sixth embodiment, the image pickup device 101 is arranged to alternately perform, for every frame, an ordinary action and an electronic zooming action on an area the address of which is obtained from the visual line sensor 117. A zoomed image obtained by the electronic zooming action is sent to the frame memory 122.

The image combining circuit 123 then combines the zoomed image and a total image obtained one frame period after into a composite image. The composite image is color-separated by the RGB decoder 108 to be recorded by the VTR 103 and also to be displayed by the LCD 109.

Figure 14:
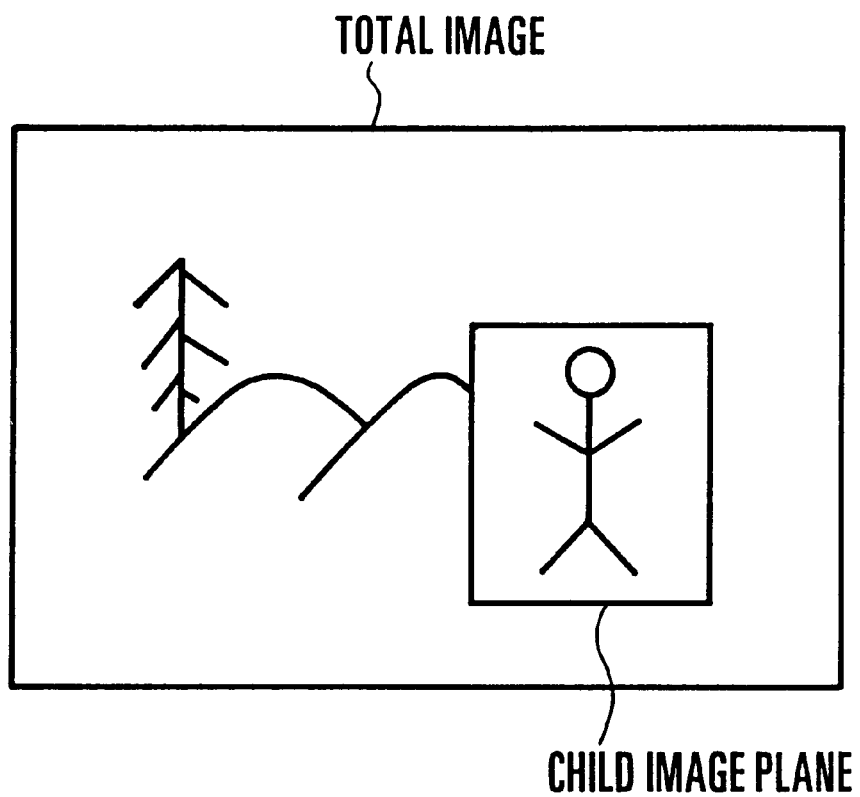
FIG. 14 shows image information obtained on the LCD of the sixth embodiment of this invention.

FIG. 14 shows a display image plane on the LCD 109. A specific image can be displayed and recorded as a child image plane within a total image. Further, the arrangement of the sixth embodiment dispenses with the AF area designation switch 114 which is included in each of the fourth and fifth embodiments described in the foregoing.

Further, the sixth embodiment is arranged to process both the total image and the zoomed image in a cycle of one frame. However, in a case where the zoomed image for one frame is to be displayed for the total image for a plurality of frames, a storoboscopic effect can be attained on the child image plane of a multi-window arrangement. If the relation between the total image and the zoomed image is conversely arranged, a storoboscopic effect is attainable on the total image.

This invention is not limited to the arrangement of the embodiments described. Various modifications and changes may be made without departing from the scope and spirit of this invention.

For example, while the fourth and fifth embodiments are arranged to perform the series of actions including the area designating action, the zooming action and the AF action on a divided area while recording is in process, the arrangement may be changed to carry out these actions while the VTR is in a pause state before recording.

More specifically, the camera-integrated type VTR may be arranged to automatically cause the pilots lamps of the divided areas to be serially lighted one after another after a pause button is pushed to give an instruction for a pause. The camera-integrated type VTR also may be arranged to automatically perform the visual line sensing action after the pause button is pushed. Further, in the case of the fourth and fifth embodiments, the image of a specific area is displayed in an enlarged state on the LCD 109. However, the subject matter of this invention would be unimpaired with this action omitted.

As described in detail above, the camera-integrated type VTR which is the fourth embodiment of this invention is provided with the specific area selecting means for selecting a specific area in an object area while causing the operator to view the specific area, and focusing means arranged to focus the lens on the specific area selected by the specific area selecting means and to cause the viewfinder part to display an image corresponding to the specific area. The arrangement of these parts enables the embodiment to accurately perform an AF action on a desired part even in complex cases where there are many persons or where persons are dispersedly located at far and near distances. This arrangement gives a great advantage to the operator because the camera body does not have to be moved for the AF action under such a condition.

The fifth embodiment includes the visual line sensing means for sensing the direction of the visual line of the operator. The specific area selecting means can designate an AF area at the position of the visual line by selecting the specific area on the basis of the direction of the visual line sensed by the visual line sensing means. The arrangement enables the operator to confirm the accuracy of the AF action through a zoomed-up image.

The sixth embodiment is provided with display means for displaying a specific area of an object image and a total area of the object image together in a multi-window state in the viewfinder part. Therefore, an image on which the AF action is desired to be made can be displayed simultaneously with the total image.

Incidentally, while the electronic zooming is used for a zooming operation in the above-stated embodiments, the optical zooming in which a zoom lens is driven may be used instead.

What is claimed is:

1. An image pickup apparatus comprising:

image pickup means for photo-electrically converting an image of an object of shooting into a picked-up image signal and outputting the picked-up image signal;

monitor means for displaying an image represented by the picked-up image signal outputted from said image pickup means;

detecting area setting means for setting a detecting area to extract a predetermined component of the image signal;

visual line detecting means for detecting a position of a visual line in an image screen of said monitor means;

image enlarging processing means for electronically enlarging an image signal and causing said monitor means to display the enlarged image; and controlling means for adaptively controlling said detecting area setting means and said image enlarging processing means on the basis of an operation of said visual line detecting means to enlarge an image of a region including the position of the visual line in the image screen of said monitor means and to set the detecting area at the position of the visual line.

2. An apparatus according to claim 1, wherein said monitor means is an electronic viewfinder.

3. A apparatus according to claim 1, wherein said visual line detecting means is arranged to select a desired area from among a plurality of divided areas obtained by dividing beforehand the image screen of said monitor means.

4. An apparatus according to claim 3, wherein said detecting means includes means for detecting the position of a visual line of an operator of the apparatus within the image screen of said monitor means and setting, as a selected area, an area which corresponds to the detected position of the visual line.

5. An apparatus according to claim 1, wherein said image enlarging processing means is electronic zooming means for electronically varying a range of reading from said image pickup means.

6. An apparatus according to claim 3 or 4, further comprising focus detecting means for detecting a state of focus by extracting a predetermined signal component which varies with the state of focus, from a portion of the picked-up image signal which corresponds to the selected area.

7. An apparatus according to claim 3 or 4, further comprising display means for serially displaying the plurality of divided areas and a selection switch for selecting the desired area from among the plurality of divided areas when the desired area is displayed by said monitor means.

8. An image pickup apparatus comprising:
   image pickup means for photo-electrically converting an image of an object formed on a pickup image plane into a picked-up image signal and outputting the picked-up image signal;
   focus detecting means for detecting a focus state of the image of the object on the basis of the picked-up image signal;
   monitor means for displaying an image represented by the picked-up image signal outputted from said image pickup means;
   selection means for selecting an area for which the state of focus is to be detected by said focus detecting means, from within an image plane of said monitor means; and
   image enlarging processing means for enlarging an image of the area for detecting the state of focus selected by said selection means and causing said monitor means to display the enlarged image so as to confirm the state of focus.

9. An apparatus according to claim 8, wherein said monitor means is an electronic viewfinder.

10. An apparatus according to claim 8, wherein said selection means includes means for detecting the position of a visual line of an operator of the apparatus within the image screen of said monitor means and setting, as the focus detecting area, an area which corresponds to the detected position of the visual line.

11. An apparatus according to claim 8, wherein said image enlarging processing means is electronic zooming means for electronically varying a range of reading from said image pickup means.

12. An apparatus according to claim 8, wherein said focus detecting means is arranged to detect the state of focus on the basis of a high frequency component of the picked-up image signal.

13. An image pickup apparatus comprising:
   image pickup means for photo-electrically converting an image of an object of shooting into a picked-up image signal and outputting the picked-up image signal;
   monitor means for displaying on an image screen an image represented by the picked-up image signal outputted from said image pickup means;
   visual line detecting means for detecting on the image screen a position of a visual line of an operator of the apparatus from within the image screen of said monitor means;
   detecting area setting means for setting a detecting area at the position of the visual line to extract a predetermined component of the image signal; and
   image enlarging processing means for enlarging an image obtained at the position of the visual line detected for a predetermined time by said visual line detecting means and causing said monitor means to display the enlarged image on the image screen so as to enlarge an image in the detecting area.

14. An apparatus according to claim 13, wherein said monitor means is an electronic viewfinder.

15. An apparatus according to claim 13, wherein said image enlarging processing means is electronic zooming means for electronically varying a range of reading from said image pickup means.

16. An apparatus according to claim 13, further comprising selection means for selecting a desired area from among a plurality of divided areas obtained by dividing beforehand the image screen of said monitor means.

17. An apparatus according to claim 16, further comprising focus detecting means for detecting a state of focus by extracting a predetermined signal component which varies with the state of focus, from a portion of the picked-up image signal which corresponds to the selected area.

18. A camera-integrated video recorder having photo-electric converting means for converting an optical image of an object into an electrical signal and a video monitor part arranged to display an image of the object represented by the electrical signal, comprising:
   visual line detecting means for detecting a visual line of an operator on an image screen of said video monitor part
   specific area selecting means for selecting a specific area corresponding to a position of the visual line of the operator detected by said visual line detecting means and displaying the specific area for the operator;
   focusing means for performing a focusing action on the specific area selected by said specific area selecting means and displaying an image corresponding to the specific area on the image screen of said video monitor part; and
   image enlarging means for enlarging the image to be focused and displayed in the specific area selected by said specific area selecting means so as to confirm a focus condition of an image in the specific area.

19. A camera-integrated video recorder according to claim 18, further comprising visual line sensing means for sensing the direction of a visual line of the operator, said specific area selecting means being arranged to select the specific area on the basis of the direction of the visual line sensed by said visual line sensing means.

20. A camera-integrated video recorder according to claim 18 or 19, wherein said monitor part displays in a multi-window state the specific area of the object image and the total area of the object image together.

* * * * *